June 26, 1951　　　W. G. BIHLER　　　2,558,289
INDEXIBLE TABLE

Filed Feb. 8, 1946　　　　　　　　　　　6 Sheets-Sheet 1

INVENTOR
*Walter G. Bihler*

BY *Barnes, Kisselle, Laughlin & Raisch*
ATTORNEYS

June 26, 1951 W. G. BIHLER 2,558,289
INDEXIBLE TABLE
Filed Feb. 8, 1946 6 Sheets-Sheet 2
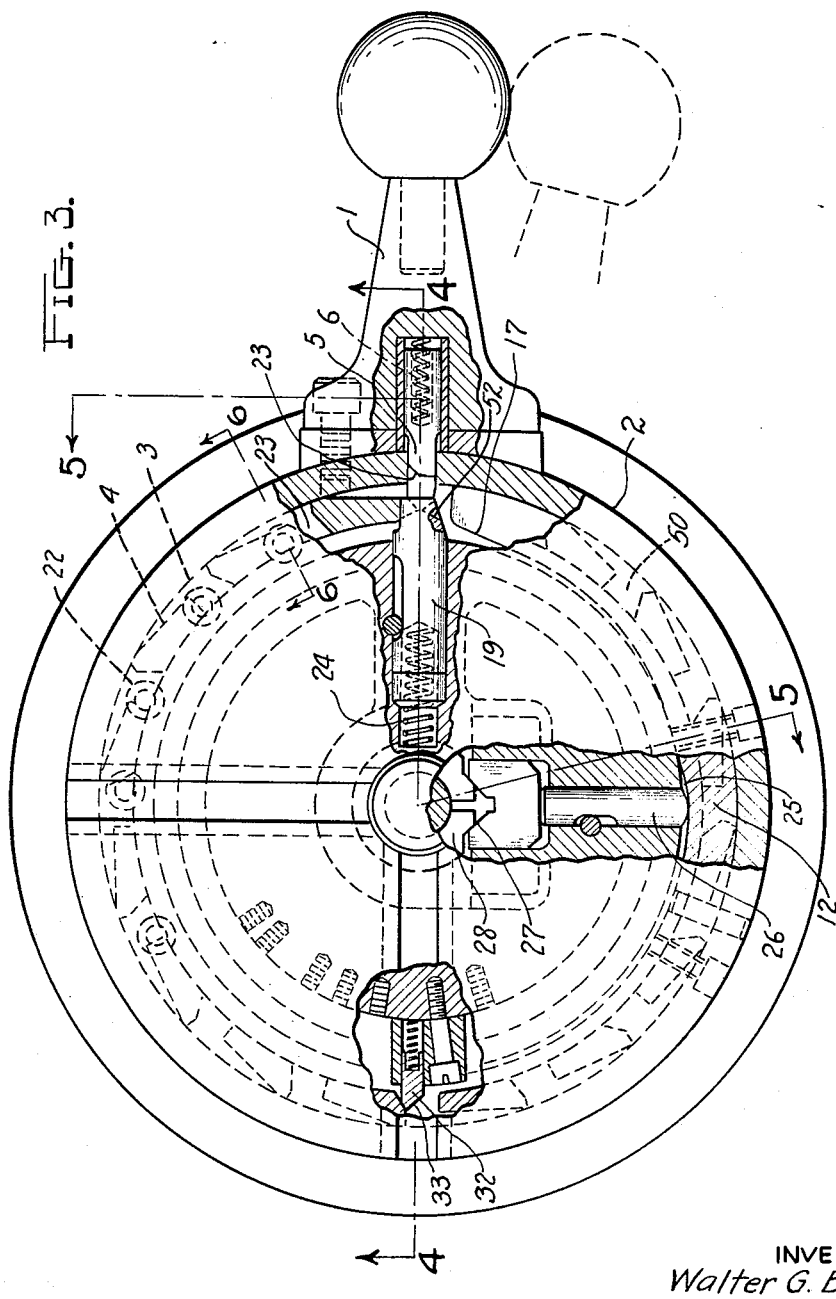
INVENTOR
Walter G. Bihler
BY
ATTORNEYS June 26, 1951
W. G. BIHLER
2,558,289
INDEXIBLE TABLE
Filed Feb. 8, 1946
6 Sheets-Sheet 3
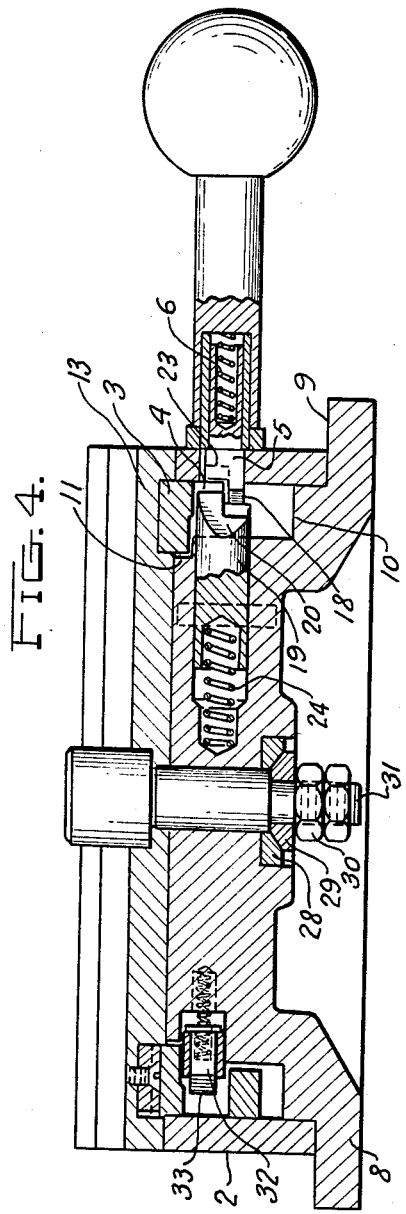
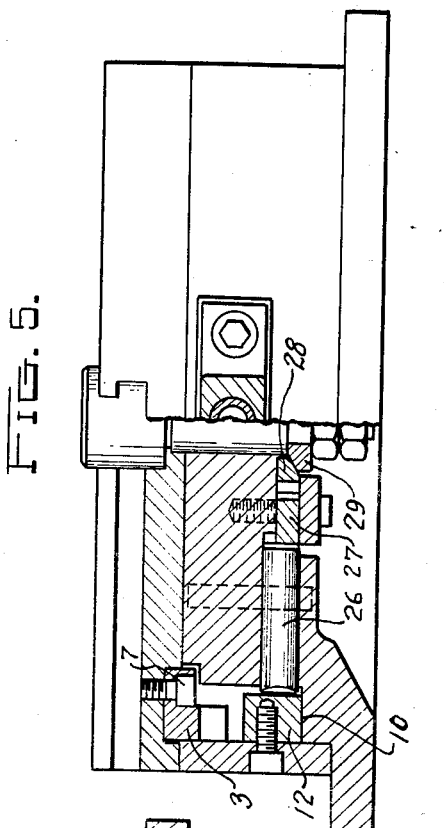
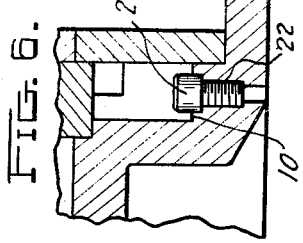
INVENTOR
Walter G. Bihler
BY
Barnes, Kisselle, Laughlin & Raisch
ATTORNEYS June 26, 1951 W. G. BIHLER 2,558,289
INDEXIBLE TABLE
Filed Feb. 8, 1946 6 Sheets-Sheet 4
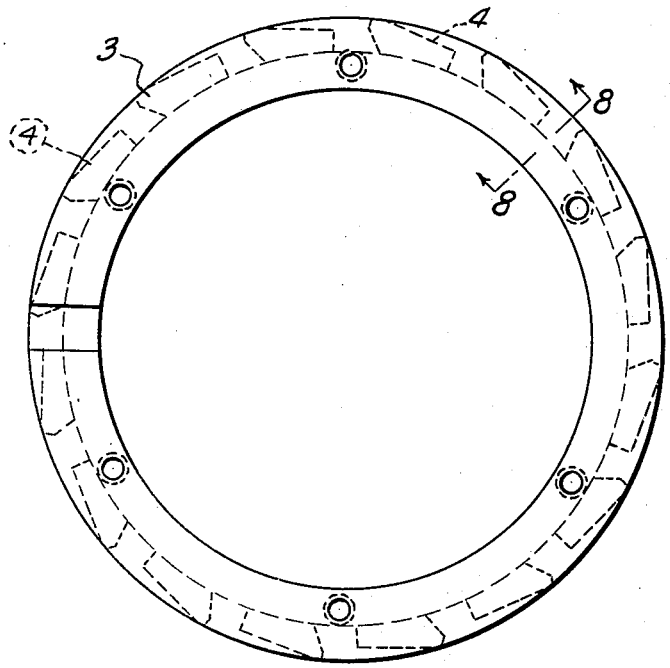
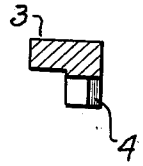
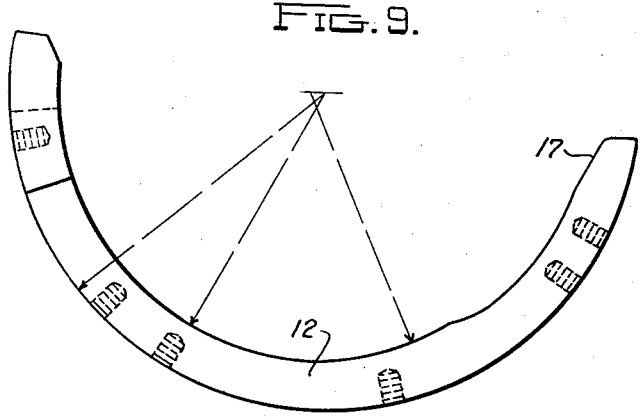
INVENTOR
Walter G. Bihler
BY
Barnes, Kisselle, Laughlin & Raisch
ATTORNEYS June 26, 1951 — W. G. BIHLER — 2,558,289
INDEXIBLE TABLE
Filed Feb. 8, 1946 — 6 Sheets-Sheet 5
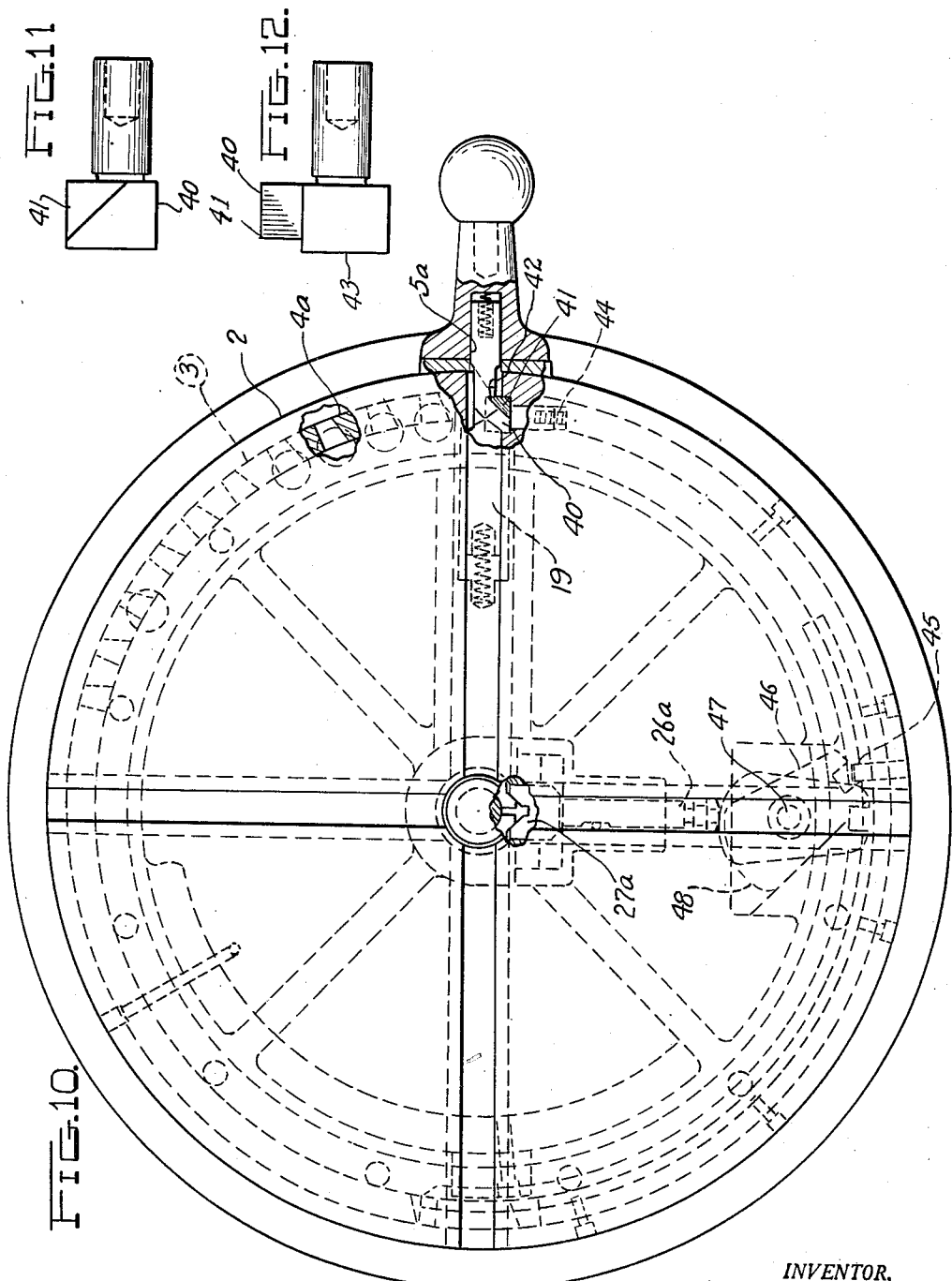
INVENTOR.
Walter G. Bihler
BY
Barnes, Kisselle, Laughlin & Rauch
ATTORNEYS June 26, 1951     W. G. BIHLER     2,558,289
INDEXIBLE TABLE Filed Feb. 8, 1946     6 Sheets-Sheet 6

INVENTOR.
Walter G. Bihler
BY
Barnes, Kisselle Laughlin & Raisch
ATTORNEYS

Patented June 26, 1951

2,558,289

UNITED STATES PATENT OFFICE 2,558,289

INDEXIBLE TABLE

Walter G. Bihler, Franklin, Mich., assignor to Special Machine & Engineering Company, Hazel Park, Mich., a corporation of Michigan Application February 8, 1946, Serial No. 646,366

9 Claims. (Cl. 77—64)

This invention relates to an index fixture for indexing work or tools carried on the rotatable table of the fixture.

Rotatable indexing tables or fixtures are not broadly new, but I believe that the hereinafter described fixture has marked points of superiority and effectiveness over what has heretofore been proposed or made. My indexing fixture permits the indexing table to be turned each time the selected amount of turn and then firmly and reliably clamped in an absolutely stationary position. This is easily done by simply swinging a handle back the required distance the table is to turn to pick the table up and then the table is advanced the required distance and an automatically-operated detent arrests the table in the correct position and at the same time the driving connection between the handle and the table is released and the handle can continue a short movement which serves through suitable instrumentalities to securely clamp the table down against the stationary body of the fixture to make the table absolutely immovable.

In the drawings:

Fig. 3 is a plan view of the indexing fixture with some of the parts broken away and sectioned to show the interior construction.

Figs. 4, 5 and 6 are taken on corresponding section lines of Fig. 3.

Fig. 7 is a plan view of the indexing or ratchet ring that is fastened to the outer side of the table.

Fig. 8 is a section on the line 8—8 of Fig. 7.

Fig. 9 is a detail of the cam ring.

Fig. 10 is a plan view of a modified form of the indexing fixture involving a much larger number of lands.

Figs. 11 and 12 are details of the detent used in connection with the latch in the modified form of construction.

Figure 14:
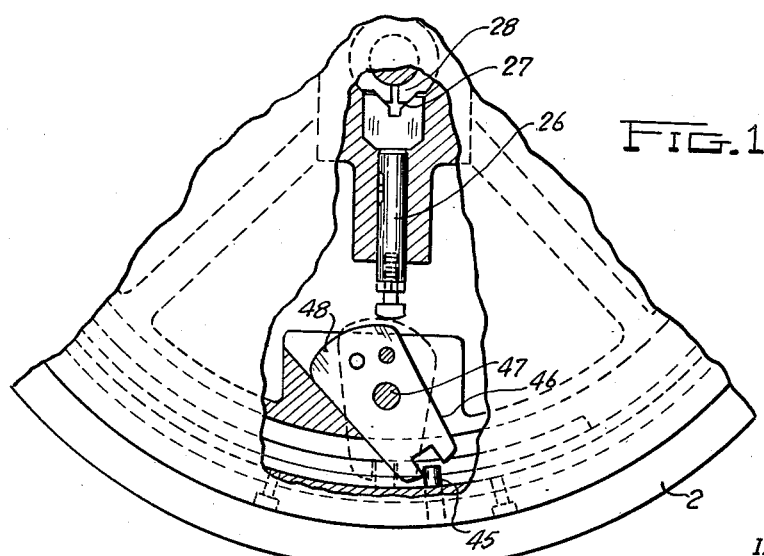
Fig. 14 is a broken away view of the clamping mechanism shown at the right in dotted lines in Fig. 10.

Referring to Fig. 3: The handle is designated 1. This is bolted to a driving ring 2. An indexing or ratchet ring 3 is shown in detail in Figs. 7 and 8 and comprises a ring member on the bottom of which are a plurality of lands 4. Their shape is shown dotted in Fig. 7. The spaces between the lands serve as pockets or recesses for the driving pawl 5 which is pressed by spring 6 so that it is adapted to engage in a pocket or recess when the pawl registers with the same. The indexing ring is bolted to the table by the bolts 7, as shown in Fig. 5. The index pin 19 when it registers with the pawl 5 keeps the ratchet-engaging portion 60 out of range of the ratchet members 4 (see Fig. 14). When the pawl is out of registry with the index pin the pawl may drop into the pocket 50 between the ratchet member 4.

Figure 1:
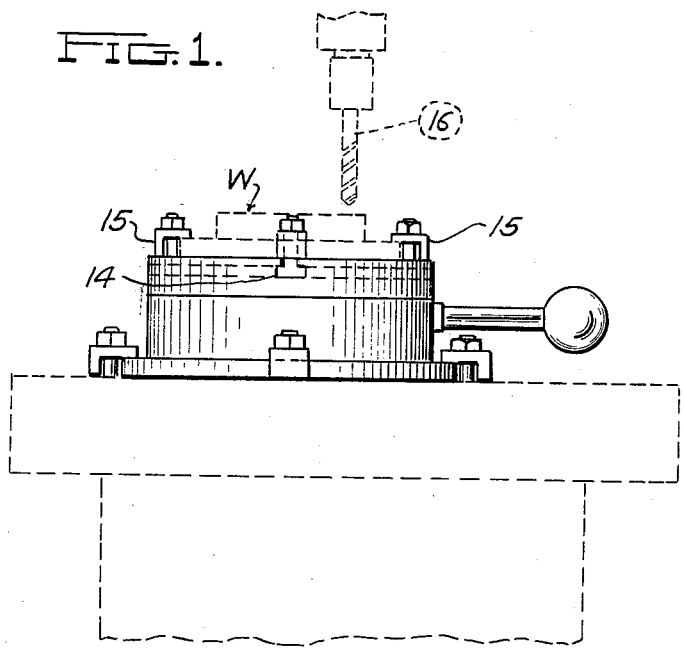
Fig. 1 is an elevation of the indexing fixture showing it mounted on a bench carrying work and in position for the application of a tool.
Figure 2:
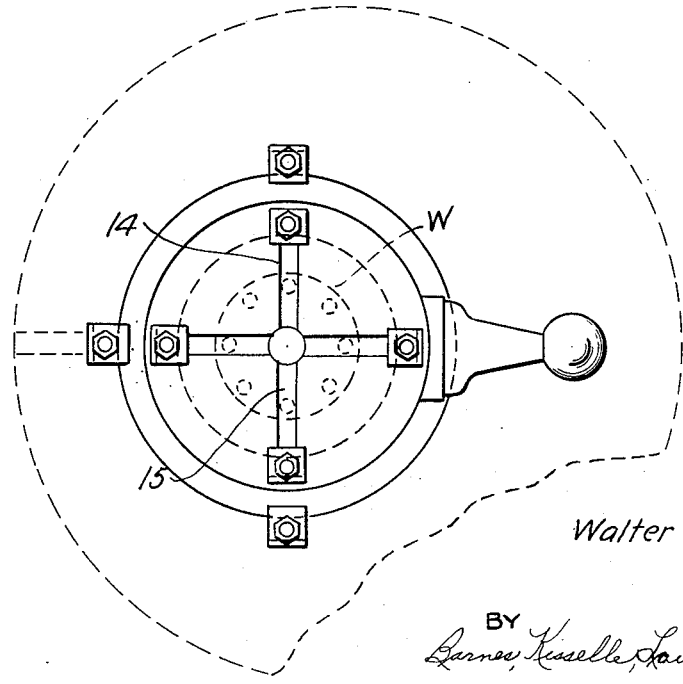
Fig. 2 is a plan view of the same.

The body or bed 8 of the fixture is shown in Figs. 4, 5 and 6. This comprises a casting properly machined to provide steps 9, 10 and 11. These are annular and extend clear around the body. Step 9 supports the driving ring 2. Bolted to this driving ring is the cam segment 12. This cam segment seats an annular step 10 and indexing ring 3 seats on the annular step 11. The work table is designated 13 and is provided with the usual diametrical dovetailed grooves 14 to receive the lower ends of work clamps 15 which will be seen in Fig. 1 clamping the work W in position on the table for the application of the tool 16, which is here shown as a drill.

Figure 13:
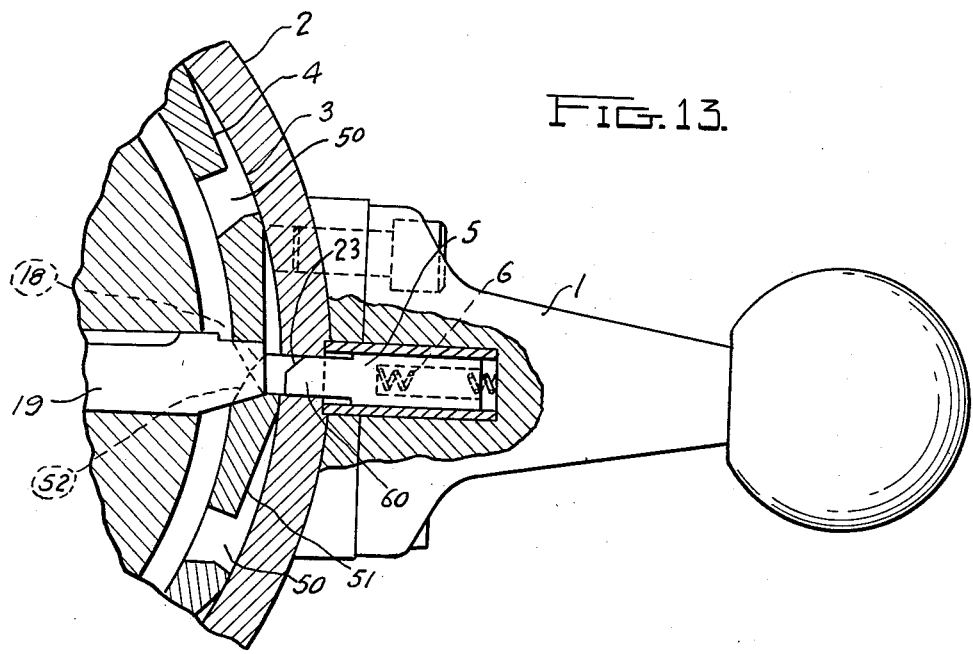
Fig. 13 is a section of the pawl and indexing pin similar to Fig. 3 but upon a plane above the section shown in Fig. 3.

The operation of the machine is as follows: The handle 1 is swung counterclockwise. The portion 60 of pawl 5 rides freely over the inclined backs 51 of the lands because it is only the upper portion 60 of the pawl that is in the plane of the lands (see Fig. 4). This upper or ratchet engaging portion has a corner chamfered off at 23. When the pawl enters a pocket 50 between the lands the chamfered portion 23, as the handle is turned counterclockwise, permits it to pull out of the pocket and climb up the next land. The number of lands ridden over will be determined by the placing of the stop screw 21 which is screwed into one of the threaded holes 22 to determine the amount the table shall turn each time. The stop screw is encountered by the end of the cam segment 12 and this arrests the whole rotating unit 1, 2, 5 and 12. At the beginning of the counterclockwise turning (see Fig. 3) the cam surface 17 on the cam segment strikes the beveled surface 20 of the indexing pin 19 and automatically pushes back the pin and keeps it back during counterclockwise rotation. When the rotating unit is stopped by the stop screw, the driving pawl has shot into a pocket between two lands, and now by turning the handle clockwise the pawl engages the adjacent land and rotates the whole unit (1, 2, 12, 3 and 13) clockwise until the pawl and the index pin are again in registry, whereupon the cam 17 again having released the index pin, the pin by reason of the pressure of the spring 24 shoots into the pocket registering with the pins and causes the driving pawl to be pressed into a position of retreat, as shown in Fig. 3. In this position the upper portion 60 of the pawl, and this is the portion that is in the same plane as the lands and is pushed out beyond the lands (see Fig. 13). The underside 52 of the index pin contacting the two beveled surfaces 18 of the under portion of the pawl pushes the pawl back and holds it withdrawn. The handle may now be swung still further clockwise over the next land (see Fig. 13) taking along with it only the driving ring 2 and the cam segment 12. Thereupon the cam surface 25 (see Fig. 3) of the cam segment pushes pin 26 radially inwardly, and this pin has on its end a V-cam 27 which is adapted to constrict the split spring band 28 upon the cam ring 29 (Fig. 4) to pull the cam ring 29 downwardly, carrying nuts 30 which are on stem 31. This pulls the stem 31 downwardly and pulls the work table 13 firmly down against the top of the bed of the machine so as to bind the table and bed tightly together and prevents any movement of the table with respect to the bed. This cam pin, cam, split spring band and stem form a clutch that securely clutches the table to the bed after the index pin goes into operation to release the driving pawl and stop the turning of the table.

After the indexing pin has been released by the cam a safety detent prevents the table and the indexing or ratchet ring from being turned as the handle is turned back to grip the table again. This is afforded by a latch 32 (see Fig. 3). On clockwise rotation of the indexing plate the lands strike the beveled surface 33 of the latch and force it out of the way, but the latch each time springs into each pocket between two lands when the pocket registers with the land. This latch forms a detent holding the driving ring against backward or counterclockwise turning movement when the handle is thrown backward or counterclockwise to the stop to latch with the table again preparatory for turning it clockwise again.

In the modified form of indexing fixture shown in Fig. 10, the lands are so spaced that there may be forty-eight of these lands 4a around the indexing ring 3. In place of having the latch drop into each pocket between two lands as the driving ring is swung counterclockwise, the latch is locked in its position of retreat until the stop screw 21 is reached. This is effected by means of the latch detent 40 which has a tooth portion 41 adapted to shoot into the V-recess 42 of the latch 5a when the latch registers with the index pin 19, as shown in Fig. 10. Hence, when the driving ring 2 is swung counterclockwise, the latch is held in its position of retreat by detent 40 and tooth 41 until the stop screw 21 is reached, thereupon the head 43 of the detent strikes the stop screw and causes the detent to retreat and compress a detent spring 44. The latch now can shoot into the pocket ahead of the stop screw 21.

In place of the cam surface 25 operating directly on pin 26, as shown in Fig. 3, in the modified form of the construction pin 45 on the driving ring strikes the outer end of cam lever 46 and rocks this lever about pivot pin 47 and causes cam surface 48 to push pin 26a radially inwardly causing V-cam 27a to operate in the same way as already explained to constrict the split band 28 (Fig. 3) on the cam ring 29 (Figs. 4 and 5), thereby pulling the work table tightly down on the bed of the machine and preventing any movement of the table with respect to the machine.

From the above description it will be seen that by a simple turning movement of the handle, which in effect is a ratchet lever, the table is given a step-by-step advance and at the completion of each step the table is firmly clutched or locked in the correct position and is held there against any movement whatsoever while the tool is applied to the work. Furthermore, the table is also prevented by a considerable detent from accidentally being swung back when the ratchet lever is swung back to take another grip on the table. These several functions are accomplished by means of an ingenious arrangement of cams and spring-propelled pins.

I claim:

1. An indexing fixture comprising a body, an indexing table provided with ratchet members secured thereto and rotatably supported upon the body and a handle member rotatable on the body and provided with a pawl arranged to engage a ratchet member to connect with the table for rotative movement of a determined amplitude, clutching or clamping mechanism operated by a free movement of the handle after the end of the turning movement of the table moving and clamping the table into immovable relation with respect to the body of the machine, and means for releasing the pawl from its engagement with the ratchet member and the table at the end of the predetermined movement of the table so that the handle may continue in movement to operate the table clamping means, said means comprising a spring-pressed index pin in the body arranged to shoot out when the pawl and the index pin register at the termination of the movement of the index table and which thereby releases the pawl from the ratchet members and the table and permits it to continue its turning.

2. An indexing fixture comprising a body, an index table supported to rotate upon the body in only one direction, a plurality of lands or ratchet members secured to the index table, a ratchet driving member supported to turn on said body and including a spring-pressed pawl for engaging and driving a land when the driving member is turned in one direction, an index pin spring pressed from the body and arranged to register with the pawl at the end of the predetermined turning movement of the table for releasing the pawl from the lands, said index pin arresting the movement of the table.

3. An indexing fixture comprising a body, an index table supported to rotate upon the body in only one direction, a plurality of lands or ratchet members secured to the index table, a ratchet driving member supported to turn on said body and including a spring-pressed pawl for engaging and driving a land when the driving member is turned in one direction, an index pin spring pressed from the body and arranged to register with the pawl at the end of the predetermined turning movement of the table for releasing the pawl from the lands, said index pin arresting the movement of the table, and a cam member connected to the driving member for engaging the index pin to depress the same and release the driving pawl to encounter the lands, the said cam holding the index pin released in the backward movement of the driving ratchet member and in the forward movement thereof until the end of the turning movement of the table is reached.

4. An indexing fixture comprising a body, an index table supported to rotate upon the body in only one direction, a plurality of lands or ratchet members secured to the index table, a ratchet driving member supported to turn on said body and including a spring-pressed pawl for engaging and driving a land when the driving member is turned in one direction, an index pin spring pressed from the body and arranged to register with the pawl at the end of the predetermined turning movement of the table for releasing the pawl from the lands, said index pin arresting the movement of the table and a cam member connected to the driving member for engaging the index pin to depress the same and release the driving pawl to encounter the lands, the said cam holding the index pin released in the backward movement of the driving ratchet member and in the forward movement thereof until the end of the turning movement of the table is reached, said cam member comprising a segment secured to the ratchet driving member.

5. An indexing fixture comprising a body, an indexing table provided with ratchet members secured thereto and rotatably supported to move only in one direction upon the body and a handle member rotatable on the body and provided with a pawl arranged to engage a ratchet member to connect with the table for rotative movement of a determined amplitude, clutching or clamping mechanism operated by a free movement of the handle after the end of the turning movement of the table for clamping or clutching the table into immovable relation with respect to the body of the machine, and means for releasing the pawl from its engagement with the ratchet member and the table at the end of the predetermined movement of the table so that the handle may continue its movement to operate the table clamping means, the said clutching means comprising a cam which constricts a band and a stem having one end engaging the table and the other end enlarged to be engaged by said constricted band to move the stem longitudinally and cause the table to bind on the body of the machine.

6. An indexing fixture comprising a body, an indexing table provided with ratchet members secured thereto and rotatably supported to move only in one direction upon the body and a handle member rotatable on the body and provided with a pawl arranged to engage a ratchet member to connect with the table for rotative movement of a determined amplitude, clutching or clamping mechanism operated by a free movement of the handle after the end of the turning movement of the table for clamping or clutching the table into immovable relation with respect to the body of the machine, and means for releasing the pawl from its engagement with the ratchet member and the table at the end of the predetermined movement of the table so that the handle may continue its movement to operate the table clamping means, the said clutching mechanism comprising a radially movable pin located in the body which is cammed by the free movement of the handle to move inwardly, a cam on the inner end of the pin, a spring-split band arranged to be constricted by the cam on the end of the pin, a stem having an enlarged head on its upper end engaging the center of the indexing table and having a tapered enlargement at the lower end arranged to be engaged by the split-spring band, and when this band is constricted to move downwardly to hold the stem longitudinally and thereby cause the tables to bind on the body.

7. An indexing fixture comprising a body, an index table supported to rotate upon the body, a plurality of lands or ratchet members secured to the index table, a ratchet driving member supported to turn on said body and including a spring-pressed pawl for engaging and driving a land when the driving member is turned in one direction, an index pin spring pressed from the body and arranged to register with the pawl at the end of the predetermined turning movement of the table for releasing the pawl from the lands, said index pin arresting the movement of the table, and a safety detent for engaging between the lands to prevent counter-turning of the table when the index pin is released and the handle is turned back to take another grip on the table.

8. An indexing fixture comprising a body, an index table supported to rotate upon the body, a plurality of lands or ratchet members secured to the index table, a ratchet driving member supported to turn on said body and including a spring-pressed pawl for engaging and driving a land when the driving member is turned in one direction, an index pin spring pressed from the body and arranged to register with the pawl at the end of the predetermined turning movement of the table for releasing the pawl from the lands, said index pin arresting the movement of the table, and a detent for holding said pawl in such released position while the ratchet driving member is thrown back to the position for picking up the index table.

9. An indexing fixture comprising a body, an index table supported to rotate upon the body, a plurality of lands or ratchet members secured to the index table, a ratchet driving member supported to turn on said body and including a spring-pressed pawl for engaging and driving a land when the driving member is turned in one direction, an index pin spring pressed from the body and arranged to register with the pawl at the end of the predetermined turning movement of the table for releasing the pawl from the lands, said index pin arresting the movement of the table, a stop for limiting the back throw of the driving member and a detent for holding said pawl in released position while the pawl is thrown back to the position for picking up the index table, whereupon said detent strikes said stop and is released allowing the pawl to engage behind a land to pick up the index table ready to rotate the same.

WALTER G. BIHLER.

REFERENCES CITED

The following references are of record in the file of this patent:

UNITED STATES PATENTS

| Number | Name | Date |
| --- | --- | --- |
| 380,496 | Leman | Apr. 3, 1888 |
| 489,398 | Towne | Jan. 3, 1893 |
| 1,445,271 | Gent | Feb. 13, 1923 |
| 1,719,613 | Kohler | July 2, 1929 |
| 1,737,002 | De Vlieg | Nov. 26, 1929 |
| 1,859,111 | Rock | May 17, 1932 |
| 1,946,835 | Buhr | Feb. 13, 1934 |
| 1,985,406 | Galkin | Dec. 24, 1934 |
| 2,201,798 | Scott et al. | May 21, 1940 |
| 2,456,007 | Marsilius | Dec. 14, 1948 |

FOREIGN PATENTS

| Number | Country | Date |
| --- | --- | --- |
| 539,746 | Great Britain | Sept. 23, 1941 |